United States Patent [19]

Lever

[11] Patent Number: 4,816,122
[45] Date of Patent: Mar. 28, 1989

[54] PREPARATION OF ALUMINUM FLUORIDE FROM SCRAP ALUMINUM CELL POTLININGS

[75] Inventor: Gordon Lever, Kingston, Canada

[73] Assignee: Alcan International Limited, Montreal, Canada

[21] Appl. No.: 775,640

[22] Filed: Sep. 13, 1985

Related U.S. Application Data

[63] Continuation of Ser. No. 572,178, Jan. 19, 1984, abandoned.

[30] Foreign Application Priority Data

Jan. 25, 1983 [GB] United Kingdom ............... 8301974

[51] Int. Cl.$^4$ ................ B01D 13/02; C01F 7/50; C01B 31/02
[52] U.S. Cl. ................ 204/182.4; 423/116; 423/119; 423/126; 423/131; 423/184; 423/185; 423/461; 423/490
[58] Field of Search .............. 204/182.4, 182.3; 423/116, 119, 126, 131, 185, 490, 499, 461, 130, 184, 204, 481, 483, 488, 495, 111

[56] References Cited

U.S. PATENT DOCUMENTS

| | | | |
|---|---|---|---|
| 3,106,448 | 10/1963 | Whicher et al. | 423/116 |
| 3,787,304 | 1/1974 | Chlanda et al. | 204/182.4 |
| 4,113,831 | 9/1978 | Orth, Jr. et al. | 423/184 |
| 4,444,740 | 4/1984 | Snodgrass et al. | 423/185 |

Primary Examiner—John F. Niebling
Assistant Examiner—John S. Starsiak, Jr.
Attorney, Agent, or Firm—Cooper & Dunham

[57] ABSTRACT

Fluoride-containing wastes, arising in the aluminium industry, particularly spent cell linings from reduction cells, are digested with caustic soda for conversion of sodium cryolite to NaF.

By use of very strong caustic soda NaF may be left in the solid residues after removal of the residual liquor and recovered from such residues by water leaching.

As an alternative weaker caustic soda may be used in the digestion stage and subsequently be crystallised out from the residual liquor, after separation from the solid residues, by evaporating and/or cooling the liquor. The precipitated NaF is then conveniently redissolved in water.

The NaF solution prepared by either route is then preferably subjected to electrodialysis to recover a solution of HF from it. Such HF is conveniently converted to AlF$_3$ by reaction with alumina.

9 Claims, 4 Drawing Sheets

PREPARATION OF ALUMINUM FLUORIDE FROM SCRAP ALUMINUM CELL POTLININGS

This is a continuation of application Ser. No. 06/572,178 filed Jan. 19, 1984 now abandoned.

The present invention relates to the treatment and disposal of fluoride-containing wastes in the aluminium industry. One problem with which the present invention is concerned to the treatment of linings from electrolytic reduction cells for the production of aluminium in which the electrolytic bath has a substantial content of sodium cryolite.

After the end of the service life of the cell lining material it is necessary to treat the material before dumping it as waste to ensure that fluorine values cannot leach out from the material to provide unacceptably high contamination of ground water which may come into contact with it. Spent cell lining contains F both in the form of water-soluble NaF and in the form of sodium cryolite. Sodium cryolite, although essentially insoluble, releases soluble fluorides in contact with normal surface water. Since the fluorine values have an economic value, particularly when converted to $AlF_3$, there is also an economic impulse to recover as large a proportion of the fluoride values from the spent cell linings as may be found economically viable.

Very many alternative procedures for recovery of fluorine values have been put forward over a period of many years. Most such procedures have required the employment of severe conditions of temperature and/or pressure, involving the use of expensive pressure vessels or acid-resistant reactors.

The process of the present invention approaches the problem from a different direction. In the process of the present invention the spent cell lining material is treated with caustic soda solution for a time and temperature required to break down the sodium cryolite to NaF to such an extent that the cryolitic concentration of the spent cell lining material is so low that the treated waste, after water-washing, may be discharged as an ecologically acceptable landfill which will not result in undue fluoride contamination of surface waters. The treatment of the present invention relies on the fact that the solubility of NaF in strong caustic solutions is quite slight.

In principle the process comprises extraction of the spent cell lining with aqueous caustic soda liquor to extract the fluoride content as NaF and reducing the spent cell lining to a material which is ecologically disposable after further treatment and recovering solid NaF. Although other means may be employed for disposing of the recovered NaF, it is most conveniently achieved by redissolving it and separating its Na ion from its F ion content by electrodialysis.

The extraction of F values as NaF, relying on the low solubility of NaF in caustic solutions, may be carried out in various ways.

In one procedure the waste is digested with a very strong, preferably hot, caustic solution, which converts the sodium cryolite into NaF and sodium aluminate. The thus formed NaF is essentially insoluble and remains with the caustic-insoluble components of the waste, which is separated from the caustic liquor. The waste is washed with small quantities of cold water or relatively weak caustic solution to remove residual strong caustic liquor. The contact time is insufficient to dissolve appreciable quantities of NaF. the residue is then extracted with further quantities of water or dilute NaF solution to recover NaF in a stronger solution.

In another procedure a less concentrated hot caustic solution is employed of such concentration that the NaF is substantially taken up into solution. The caustic liquor is then concentrated and/or cooled so as to deposit NaF, which is then washed to remove residual caustic liquor. The solid NaF may then be dissolved in hot water. The sodium fluoride content (and other soluble fluorides) of the resulting solution may then be converted into HF or $AlF_3$ by an electrodialysis process. Where the product of the electrodialysis step is aqueous HF, this is preferably converted to $AlF_3$ or aluminium hydroxy fluoride by reaction with alumina hydrate or alumina.

The separated caustic liquor contains substantial quantities of sodium aluminate. In most instances a part of the caustic liquor will be recirculated to the spent cell lining treatment stage and the remainder may conveniently be disposed of as feed into a Bayer process plant, either directly or after spray-drying.

When employing the first style of procedure the caustic concentration is 200–400 g/l (calculated as $Na_2CO_3$), preferably 250–350 g/l and may be employed at any temperature from cold up to boiling point, but preferably 70°–95° C. The treatment time required for substantially complete breakdown of the sodium cryolite content of the waste is usually in the range of 15–180 minutes, dependent on the temperature and concentration of the caustic liquor.

When employing a caustic solution in the above mentioned concentration range the waste (if it is spent potlining) may be charged at the rate of 250–1250 g/liter caustic liquor, preferably at the rate of 800–1100 g/l.

The caustic concentration in the spent cell lining leaching stage in the alternative procedure is conveniently in the range of 20–70 g/l, preferably 50–70 g/l (calculated as $Na_2CO_3$). The spent cell lining may be charged to the liquor at the rate of 70–200 g/l, preferably 80–150 g/l. The time and temperature required to obtain the necessarily high rate of extraction of fluorides are inter-related. Usually the leaching operation is carried out at a temperature of 80° C. to boiling point for 30–60 minutes, but leaching may be carried out at temperature down to 50° C. at appropriately longer treatment times.

The caustic liquor after leaching is preferably concentrated to 180°–500 g/l caustic (calculated as $Na_2CO_3$) to effect deposition of NaF, whereas the deposited NaF is preferably washed with caustic liquor at a strength in the range of 20–70 g/l; for example, fresh caustic liquor for supply to the leaching stage. A caustic liquor of similar or somewhat greater strength may be employed for washing the treated waste in the first style of procedure before aqueous extraction. The leaching of NaF from the treated waste is then performed at a temperature from cold to boiling point, but preferably at a temperature of 20°–70° C. The time required for this leaching stage to achieve substantially complete solution of NaF is typically 10–180 minutes dependent upon temperature. In the preferred temperature range of 20°–70° C., a leaching time of 30–90 minutes is usually adequate at a solids charging rate of 40–400 g/l, preferably 75–200 g/l.

While it is preferred to perform the process by digesting the fluoride-bearing waste with caustic liquor in one of the two concentration ranges set out above, the digestion may be carried out with caustic liquor in an intermediate concentration range. However operation with caustic liquor at an intermediate strength is generally inconvenient since it requires both the subsequent aqueous leaching of the treated waste for recovery of solid NaF and also concentration and/or cooling of the separated caustic liquor to effect deposition of solid NaF. Nevertheless in some circumstances it may be advantageous to do so because of the reduction in digestion time and higher waste charging rates as compared with the use of caustic liquor in the range of 20–70 g/l (as $Na_2CO_3$).

NaF solution for feed to the electrodialysis stage is at a strength above 10 g/l and up to saturation. Preferably the NaF solution subjected to electrodialysis has a strength of 30–40 g/l NaF.

The leaching of the spent cell lining material with relatively low strength caustic liquor is further explained by reference to the following examples.

EXAMPLE 1

Effect of Caustic Concentration on Leaching

Spent cell lining Type A of composition shown in TABLE 1 was leached with solutions of increasing caustic concentrations. The caustic solution was held at 90° C. The spent cell lining was charged at the rate of 100 gpl of caustic solution and the leaching time was 30 minutes. The amounts of F (as NaF), $Al_2O_3$ and $Na_2CO_3$ recovered as a percentage of the original potlining are recorded in TABLE 2.

TABLE 1

COMPOSITION OF SPENT CELL LINING SAMPLES

| Component | wt % Type A | wt % Type B |
|---|---|---|
| F Total | 14.2 | 11.9 |
| F Caustic Soluble | 13.2 | 10.1 |
| $Al_2O_3$ Caustic Soluble | 10.0 | 6.8 |
| $Na_2CO_3$ | 2.5 | 0.7 |
| $SiO_2$ | 5.0 | 32.7 |
| Na Total | 13.3 | 8.1 |

Note.
Remainder is carbon and caustic-insoluble components, such as highly calcined alumina.

TABLE 2

EFFECT OF CAUSTIC CONCENTRATION ON RECOVERY OF F, $Al_2O_3$ & $Na_2CO_3$ FROM SPENT CELL LINING TYPE A

| Recovered Component as wt % of cell lining | Caustic g/l (as $Na_2CO_3$) | | | | | |
|---|---|---|---|---|---|---|
| | 20 | 30 | 40 | 50 | 60 | 70 |
| NaF | 24.3 | 28.6 | 28.6 | 28.6 | 28.6 | 26.7 |
| $Al_2O_3$ | 4.1 | 5.0 | 7.2 | 8.6 | 9.8 | 9.8 |
| $Na_2CO_3$ | 2.6 | 2.6 | 2.1 | 2.3 | 2.4 | 2.5 |

EXAMPLE 2

Effect of Caustic Concentration on Leaching

A similar test to that described in Example 1 was carried out using Type B spent cell lining of composition shown in TABLE 1 under the same conditions as in Example 1. The chemical values recovered are shown in TABLE 3.

TABLE 3

EFFECT OF CAUSTIC CONCENTRATION ON RECOVERY OF F, $Al_2O_3$ & $Na_2CO_3$ FROM SPENT CELL LINING TYPE B

| Recovered Component as wt % of cell lining | Caustic g/l (as $Na_2CO_3$) | | | | |
|---|---|---|---|---|---|
| | 30 | 40 | 50 | 60 | 70 |
| NaF | 17.2 | 19.9 | 19.9 | 21.4 | 21.4 |
| $Al_2O_3$ | 2.7 | 4.2 | 4.6 | 4.2 | 3.9 |
| $Na_2CO_3$ | 0.5 | 0.6 | 0.8 | 0.6 | 0.7 |

Examples 1 and 2 show that for treatments in the lower concentration range there is no advantage in terms of fluoride recovery in the caustic solution by increasing caustic concentration above about 60 g/l.

EXAMPLE 3

Effect of Temperature on Leaching

Spent cell lining Type A was leached for 1 hour at various temperatures using a caustic solution containing 60 g/l caustic soda (calculated as $Na_2CO_3$) and 100 g/l spent cell lining. The amounts of recovered chemicals are shown in TABLE 4.

TABLE 4

EFFECT OF TEMPERATURE ON RECOVERY OF F & $Al_2O_3$ FROM CELL LINING TYPE A

| Recovered Component as wt % of cell lining | Leach Temperature °C. | | | | |
|---|---|---|---|---|---|
| | 25 | 50 | 80 | 90 | Boiling |
| NaF | 15.0 | 22.1 | 24.4 | 28.0 | 28.6 |
| $Al_2O_3$ | 2.2 | 5.3 | 7.5 | 9.7 | 10.1 |

EXAMPLE 4

Effect of cell lining Charge on Leaching

Cell lining Type A was charged at different concentrations to 60 g/l caustic and leached for 30 minutes at 90° C. The results are shown in TABLE 5.

TABLE 5

EFFECT OF CELL LINING CHARGE ON RECOVERY OF F, $Al_2O_3$ & $Na_2CO_3$ FROM CELL LINING TYPE A

| Recovered Component as wt % of cell lining | Cell lining Charge g/l | | | | |
|---|---|---|---|---|---|
| | 80 | 100 | 120 | 140 | 160 |
| NaF | 26.5 | 25.5 | 23.4 | 22.0 | 19.8 |
| $Al_2O_3$ | 9.1 | 8.7 | 7.8 | 8.4 | 7.1 |
| $Na_2CO_3$ | 3.2 | 3.1 | 3.0 | 2.9 | 2.1 |

EXAMPLE 5

Effect of Time on Leaching

Cell lining Type A was leached with 60 g/l caustic (calculated as $Na_2CO_3$) at 90° C. for various times at a charging rate of 100 g/l spent cell lining. The results are reported in TABLE 6.

TABLE 6

EFFECT OF LEACHING TIME ON RECOVERY OF F & $Al_2O_3$ FROM CELL LINING TYPE A

| Recovered Component as wt % of cell lining | Time (min.) | | | |
|---|---|---|---|---|
| | 20 | 40 | 60 | 120 |
| NaF | 25.0 | 25.4 | 25.5 | 25.3 |
| $Al_2O_3$ | 8.2 | 8.8 | 9.1 | 9.5 |

EXAMPLE 6

Evaporation/Crystallisation 500 ml of caustic leach solution initially containing 60 g/l caustic was evaporated under vacuum in a rotary evaporator until the liquor volume had been reduced by a factor of approximately four and the liquor was cooled to ~30° C. The solid NaF was the separated from the concentrated liquor by filtration. Analysis of the liquor before and after evaporation showed that approximately 96% of the NaF had crystallised out of solution.

EXAMPLE 7

Evaporation/Crystallisation 300 ml of caustic leach solution initially containing 60 g/l caustic was evaporated to about 400 g/l caustic concentration in a similar way to that described in Example 6 and cooled to ~30° C. Analysis of the liquors before and after evaporation showed that 99% of the NaF had crystallised out.

EXAMPLE 8

Caustic Washing & Dissolution of Solid NaF 15 g of solid NaF from Example 6 was displacement washed with 2×15 ml portions of 60 g/l caustic solution. Analysis of the second wash showed it to contain the equivalent of 2% of the crystallised NaF. After washing, the solid NaF was dissolved in hot water. Analysis of the solution showed that the washed solid NaF was approximately 98% pure and would be suitable for dissolution in water for use as feed material for an electrodialysis operation.

It is found that the solid residues of the caustic leaching operation, after washing with water to remove residual caustic, have a sufficiently low cyanide content to permit them to be disposed of as landfill. Some further treatment, such as treatment with lime and sulphuric acid, may be required to fix residual fluorine before the residues may be disposed of in that way. However where optimum leaching conditions are employed the residual leachable fluorine is commonly reduced to a level of about 0.2% by weight of the waste.

The aqueous solution of redissolved NaF, typically containing 30–40 g/l NaF, is treated to convert the sodium fluoride content to aluminium fluoride (which term includes particularly hydrated aluminium fluoride).

The treatment of fluoride-bearing wastes, such as spent potlinings, by the alternative strong caustic treatment is illustrated by the following examples.

EXAMPLE 9

100 g of finely ground spent potlining containing 18.8% caustic-soluble $F^-$ was added to 100 ml of 291 g/l caustic (as $Na_2CO_3$). The slurry was then stirred at 90° C. for 0.5 hr and then vacuum filtered. 63 ml of filtrate of composition 231 g/l caustic (as $Na_2CO_3$), 53 g/l $Al_2O_3$ and 9.0 g/l NaF was recovered. The residue was then displacement washed with 2×40 ml of cold 100 g/l caustic (as $Na_2CO_3$). Next the residue was leached with 1 liter of water at 90° C. for 1 hr. After filtration analysis of the filtrate showed it to contain 39.8 g/l NaF equivalent to ~96% of the initial caustic soluble $F^-$.

EXAMPLE 10

The experiment described in Example 9 was repeated except the caustic washes were replaced by cold water washes. The amount of $F^-$ recovered in the water leach corresponded to 94% of the initial caustic-soluble fluoride.

EXAMPLE 11

Effect of time on Caustic Leaching

Ground potlining as employed in Example 9 was leached for various times at 60° C. using a caustic solution containing 283 g/l (as $Na_2CO_3$) and 1000 g/l potlining charge. After vacuum filtration the leachates were analysed for caustic and alumina and the following results obtained:

| Time (min) | 30 | 60 | 120 |
|---|---|---|---|
| Caustic g/l (as $Na_2CO_3$) | 268 | 227 | 200 |
| $Al_2O_3$ g/l | 27 | 37 | 44 |

The decrease in caustic concentration and increase in $Al_2O_3$ indicate the cryolite is being attacked.

The residues after displacement washing were then leached for 1 hr at 90° C. with water. Residue was charged at the rate of 100 g/l of original potlining. The results show an increase in NaF in the water leachates with increasing time in the caustic leaching.

| Caustic leach time (min) | 30 | 60 | 120 |
|---|---|---|---|
| NaF in water leach g/l | 18.4 | 23.1 | 24.0 |

EXAMPLE 12

Effect of Temperature on Caustic Leaching

Finely ground potlining containing 14.2% F was leached for 30 minutes at various temperatures in a caustic solution containing 283 g/l (as $Na_2CO_3$) and 1000 g/l potlining charge. After filtration, the leachates were analysed for caustic and alumina. The results recorded below show an increase in attack on the cryolite with temperature.

| Temperature °C. | 25 | 50 | 60 | 75 | 90 |
|---|---|---|---|---|---|
| Caustic g/l as $Na_2CO_3$ | 332 | 320 | 287 | 243 | 215 |
| $Al_2O_3$ g/l | | 10.5 | 16.2 | 23.4 | 41.2 | 55.3 |

In this example it should be noted that the initial caustic concentration increased rapidly as the result of leaching out $Na_2O$ contained in it and remained above its initial concentration as a result of slower utilisation at the lower treatment temperatures.

EXAMPLE 13

Effect of Caustic Concentration

Ground potlining as used in Example 12 was leached for 30 minutes at 90° C. in caustic solutions of various concentrations and 1000 g/l potlining charge. The leachates recovered after filtration were analysed for caustic and alumina. The results indicate an increase in attack on the cryolite with caustic concentration; the effect levelling off above 300 g/l.

| Initial Caustic g/l as $Na_2CO_3$ | 251 | 303 | 354 |

-continued

| | | | |
|---|---|---|---|
| Caustic g/l as $Na_2CO_3$ | 200 | 231 | 286 |
| $Al_2O_3$ g/l | 45.4 | 50.3 | 51.0 |

After displacement washing the residues were leached for 1 hour at 90° C. with water. Analysis of the leachates are recorded below and show an increase in NaF with caustic concentration up to ~300 g/l as $Na_2CO_3$.

| | | | |
|---|---|---|---|
| Leach Caustic Concentration g/l as $Na_2CO_3$ | 251 | 303 | 354 |
| NaF in Water Leach g/l | 24.4 | 28.7 | 28.5 |

EXAMPLE 14

Effect of Time on Water Leaching

Ground potlining as used in Example 9 was leached for 30 minutes at 60° C. using a caustic solution containing 329 g/l (as $Na_2CO_3$) and 1000 g/l potlining charge. After vacuum filtration, the residue was displacement washed with cold water followed by leaching at 70° C. with water. The residue was charged at 100 g/l based on the original potlining. Analysis of the water leachate with time showed that the extraction of NaF was rapid.

| | | | | |
|---|---|---|---|---|
| Time (min) | 15 | 30 | 45 | 60 |
| NaF in water leachate g/l | 29.5 | 30.3 | 30.5 | 31.0 |

EXAMPLE 15

Effect of Temperature on Water Leaching

Ground potlining as used in Example 12 was leached for 30 minutes at 90° C. using a caustic solution containing 300 g/l (as $Na_2CO_3$) and 1000 g/l potlining charge. After vacuum filtration and displacement washing with cold water, the residue was leached at various temperatures with water for 30 minutes. The residue was charged at 100 g/l based on the original potlining. Analysis of the leachates for NaF yielded the following results which show very little effect of temperature.

| | | | | |
|---|---|---|---|---|
| Temperature °C. | 25 | 40 | 70 | 90 |
| NaF in water leachate g/l | 29.0 | 29.2 | 30.3 | 29.6 |

Other wastes containing fluorine values arise in the aluminium industry. Aqueous liquors, containing dissolved NaF and suspended solids, arise in wet scrubbers for the off-gases from reduction cells and $AlF_3$ manufacturing plants and similarly require to be rendered harmless by extraction of fluoride values from the solids.

According to a further feature of the invention the aqueous NaF solution is treated by means of ion exchange material or by means of electrodialysis to secure a substantial separation of $Na^+$ ion from $F^-$ ion. In performing electrodialysis the process may be operated to effect removal of $Na^+$ or $F^-$ ion or both from the aqueous liquor and the resultant liquor containing HF is treated subsequently with alumina (which term includes partially or wholly hydrated alumina) to precipitate $AlF_3$, (as above defined). Alternatively the diffusate liquor may contain an aluminium salt for reaction with $F^-$ ion passing through the electrodialysis membrane. A separate treatment step may be required for precipitation of aluminium fluoride from such diffusate liquor.

In a preferred system the aqueous NaF solution is electrodialysed using a bipolar membrane system similar to that described in U.S. Pat. No. 4,107,264 so as to produce separate solutions of HF and NaOH. This has the advantage of not requiring any auxiliary chemicals (except alumina for reaction with HF) and produces valuable by-product sodium hydroxide solution for supply to a Bayer process plant. It can thus avoid the problem of disposal of sodium-containing wastes.

In all the alternatives for treating the redissolved NaF solutions, the liquor is desirably pretreated to remove any solid and dissolved material that would foul the ion-exchange material or the electrodialysis membranes in continuous commercial operation.

In the case of wet scrubber liquors, any fluoride-containing solids, after separation and washing, can be treated in a similar way to the potlinings. In addition to NaF the scrubber liquors usually contain sodium sulphate formed from the pick-up of $SO_2/SO_3$ present in the off-gases. The NaF may be separated from the $Na_2SO_4$ by electrodialysis prior to or during the separation of $Na^+$ and $F^-$.

In describing the invention in greater detail reference will be made to the accompanying drawings in which.

Figure 1:
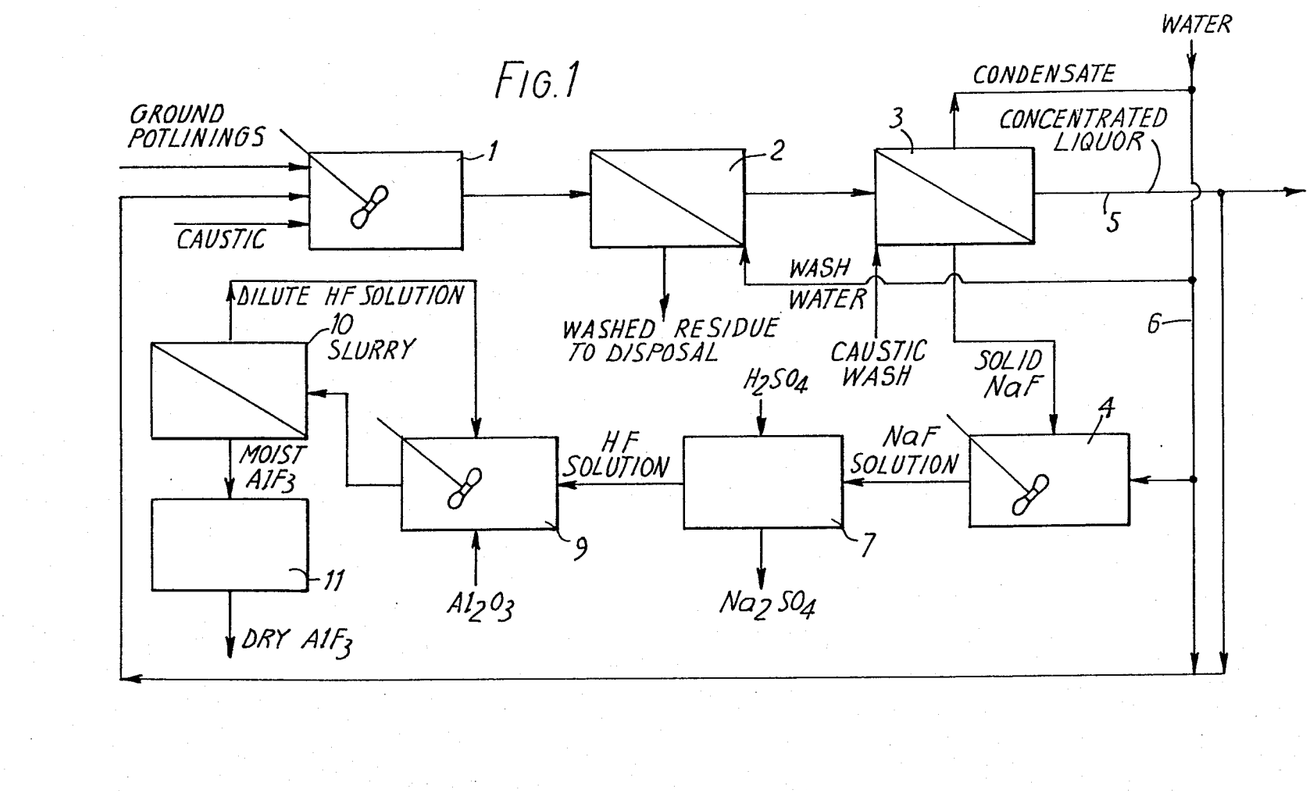
FIG. 1 is a diagram of a flowsheet for carrying out the process of the invention with low caustic concentration digestion using an electrodialyser

Finely ground spent cell lining material and hot caustic solution were supplied continuously to leaching vessel 1, in the relative proportions and temperature already indicated and a rate to achieve a dwell time of 30-60 minutes in the leaching vessel. The caustic liquor/spent cell lining slurry was then passed to a liquid/solids separator vessel 2, in which the solids are separated, washed with water and then withdrawn for disposal. The hot leach solution was then passed from the separator vessel 2 to the evaporator/crystalliser vessel 3. In the vessel 3 the leach liquor is concentrated by evaporation and the NaF is crystallised out. The deposited NaF solids are washed by relatively dilute aqueous caustic solution, as already explained, and then forwarded to the dissolver vessel 4. The concentrated caustic-aluminate liquor from evaporator 3 is led away through conduit 5, for suitable disposal, a part being recycled to the leaching vessel 1. Evaporated water from the evaporator 3 is condensed and fed into the water supply conduit 6, leading to the leaching vessel 1 and dissolver vessel 4. The feed rate for NaF solids and water feed to dissolver 4 are arranged to provide an NaF feed solution of desired strength to an electrodialyser 7, from which a solution of HF is led to a reactor 9 to which solid alumina (or alumina hydrate) is also supplied. The resultant slurry of $AlF_3$, containing some unreacted HF, is led to a separator 10, from which moist $AlF_3$ is forwarded to a final dryer 11 and dilute HF is recirculated to reactor 9.

In the apparatus of FIG. 1 the electrodialyser 7 may be replaced by an ion exchange treatment vessel coupled with an ion exchange resin regeneration stage in which the resin is regenerated by treatment with sulphuric acid. In this alternative the ion exchange resin would be of the cation-exchanging type. The resin would be continuously circulated through the treatment vessel and regeneration stages for continuous removal of sodium ion from the system.

Figure 2:
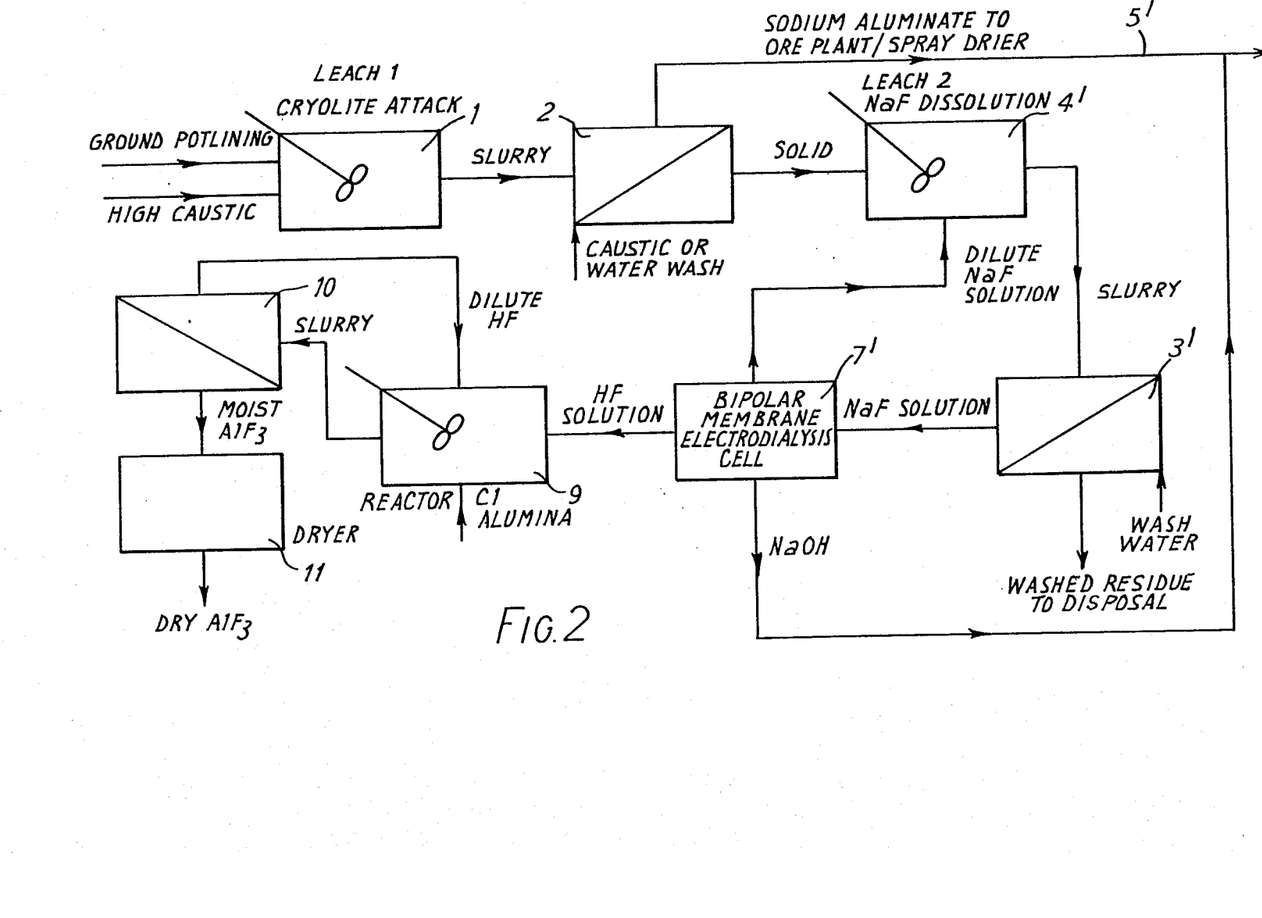
FIG. 2 is a diagram of a flowsheet for carrying out the process using high caustic concentration digestion

In the modified system shown in FIG. 2 in which the treatment of waste potlining is carried out with caustic liquor in which NaF is essentially insoluble, ground potlining and high caustic liquor are supplied to a leaching vessel 1. The resulting slurry is passed to a liquids/solid separator 2, from which the caustic liquor, containing sodium aluminate, is passed wholly or in part to a Bayer process plant via conduit 5'. A part of this liquor may conveniently be recirculated to the leaching vessel 1.

The solids, containing deposited NaF, is passed from separator 2 to a second leaching vessel 4', in which the solids are leached with water or dilute NaF solution to extract the deposited NaF. The resultant slurry is passed to a secon liquids/solids separator 3', from which the solids are discharged for disposal while the solution of NaF is led to a bipolar membrane electrodialysis cell 7', from which a solution of HF is led to reactor 9, as in the system of FIG. 1.

A stream of caustic liquor is led via conduit 6' from the cell 7' for combination with the caustic liquor separated in the separator 2.

Figure 7:
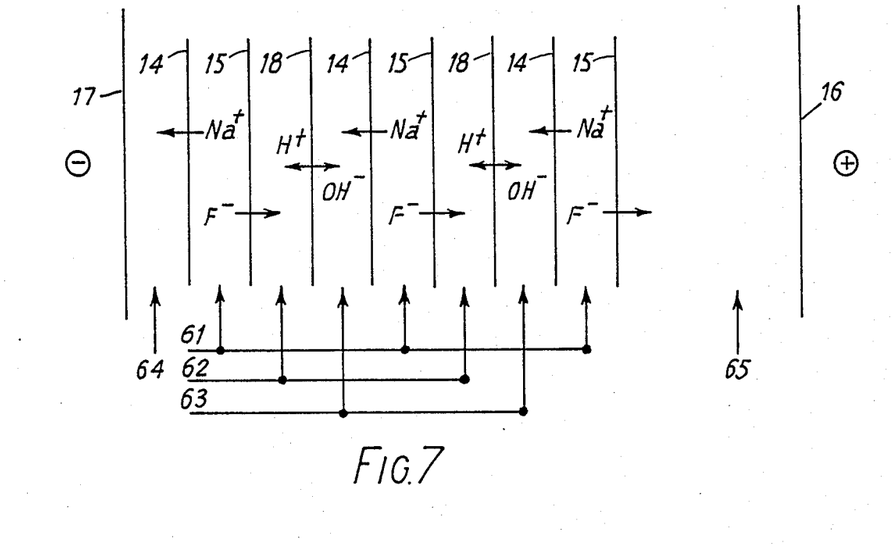
FIG. 7 is a diagram of an electrodialysis apparatus, employing a cation-transporting membrane, bipolar membrane anode transporting membrane.

The bipolar membrane cell 7' consists of multiple unit cells between a set of electrodes as shown in FIG. 7. Each unit cell consists of a cation transporting membrane 14, a bipolar membrane 18, and an anion transporting membrane 15. The bipolar membrane will split water into $H^+$ and $OH^-$ when sufficient electric potential is applied across it. When a concentrated stream of NaF is passed through passages 61 and D.C. is applied between anode 16 and cathode 17 then $F^-$ is transported through membrane 15 and $Na^+$ through membrane 14 resulting in a dilute NaF stream leaving passages 61 for return to the vessel 4'. If a dilute HF solution is passed through passages 62 it will pick up additional HF produced by the combination of $F^-$ transported through membrane 15 and $H^+$ generated by transport through bipolar membrane 18 to yield a more concentrated HF solution. The dilute HF stream from separator 10 in FIG. 2 may be returned as an input to the bipolar membrane electrodialysis cell in place of return to the reactor 9. Similarly if a dilute caustic solution is passed through a passages 63 it will pick up NaOH produced by the $Na^+$ transported through membrane 14 and $OH^-$ generated by transport through membrane 18 to yield a more concentrated NaOH solution.

EXAMPLE 16

Figure 3:
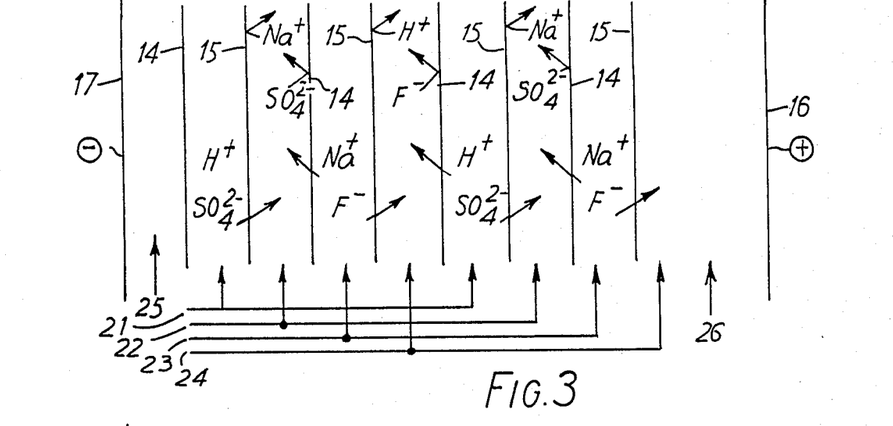
FIG. 3 is a diagram for treatment of the NaF solution by electrodialysis, using four liquor streams and alternate anion- and cation-transporting electrodialysis membranes

The operation of the electrodialyser 7 of the system of FIG. 1 is further illustrated in FIG. 3 in which four separate streams are passed between alternately located cation-transporting membranes 14 and anion-transporting membranes 15, while D.C. was passed through the liquid stream between anode 16 and cathode 17.

In this case streams of the NaF-containing extract liquor are passed through passages 23 and dilute $H_2SO_4$ is passed through passages 21 as a donor of $H^+$ ion. Streams of dilute sodium sulphate pass through passages 22 to act as an acceptor of both $Na^+$ and $SO_4^{--}$ ions while streams of dilute HF pass through passages 24 to accept $H^+$ and $F^-$ ions. A stream of dilute $Na_2SO_4$ was passed through passages 25 and 26 to act as an electrode rinse for the cathode 17 and anode 16. Conditions of the experiment (including starting concentrations) are shown in TABLE 7. The equipment is operated in the continuous recirculation mode, i.e. each solution is pumped from its reservoir through the appropriate channels of the electrodialysis stack and back to its reservoir. Samples are taken periodically from each stream for analysis. Results of the variation in concentration of $H^+$, $F^-$ and $SO_4^{--}$ with time were taken. From the results it was found that after 45 minutes most of the $H^+$ from the $H_2SO_4$ stream and most of the $F^-$ from the NaF stream have transferred into stream 24 to produce HF. Similarly most of the $SO_4^{--}$ had transferred from stream 21 to stream 22 to combine with the $Na^+$ to give $Na_2SO_4$. From analysis of stream 24 it was found that a relatively pure HF was produced.

TABLE 7

| | EXPERIMENTAL CONDITIONS | | |
|---|---|---|---|
| Stream No. | Volume −1 | Composition g/l | Flow ml/min |
| 21 | 2 | 11.7 $H_2SO_4$ | 180 |
| 22* | 2 | 3.4 $Na_2SO_4$ | 180 |
| 23 | 2 | 10 NaF | 180 |
| 24* | 2 | 0.9 HF | 180 |
| 25 | 0.5 | 4 $Na_2SO_4$ | 120 |

Stream 25 = Electrode Rinse
*$Na_2SO_4$ and HF respectively were added to streams 22 and 24 to provide conductivity at start of test. No. of cell pairs 10. Voltage 18 V. Initial Current Density 15 mA/cm². Duration of Run 60 minutes.

EXAMPLE 17

Figure 4:
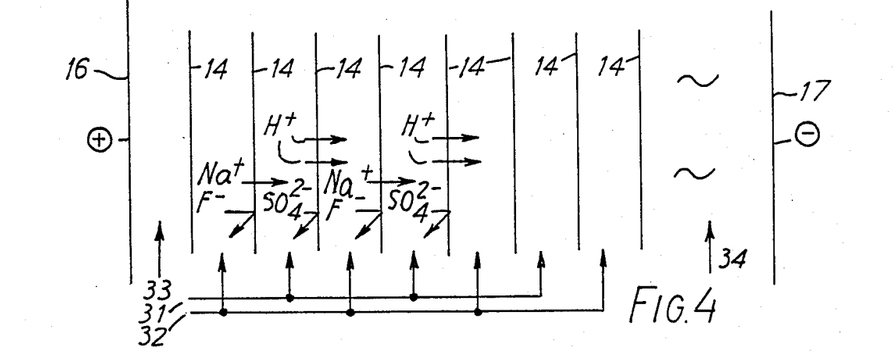
FIG. 4 is a similar diagram of a two-stream apparatus employing cation-transporting membranes only

In this example electrodialysis of an NaF solution was performed using the configuration illustrated in FIG. 4 in which all the membranes 14 are cation-transporting membranes. Streams 32 of the NaF liquor and 31 of sulphuric acid solution was passed between alternate membrane pairs while D.C. is passed between anode 16 and cathode 17. Streams 33 and 34 are a dilute sodium sulphate electrode rinse for anode 16 and cathode 17 to prevent polarisation of the anode. Conditions of the experiment are shown in TABLE 8.

TABLE 8

| | EXPERIMENTAL CONDITIONS | | |
|---|---|---|---|
| Stream No. | Volume 1 | Composition g/l | Flow ml/min |
| 31 | 2 | 11.7 $H_2SO_4$ | 360 |
| 32 | 2 | 10. NaF | 360 |
| 33 | 0.5 | 4. $Na_2SO_4$ | 150 |

Number of cell pairs 5. Volume 8 V. Initial Current Density 13 mA/cm². Duration of run 60 minutes.

The electrodialysis was carried out in the continuous recirculation mode. Samples were taken periodically from each stream for analysis. from the results it was found that about 75% of the NaF has been converted to HF after about 45 minutes.

EXAMPLE 18

Figure 5:
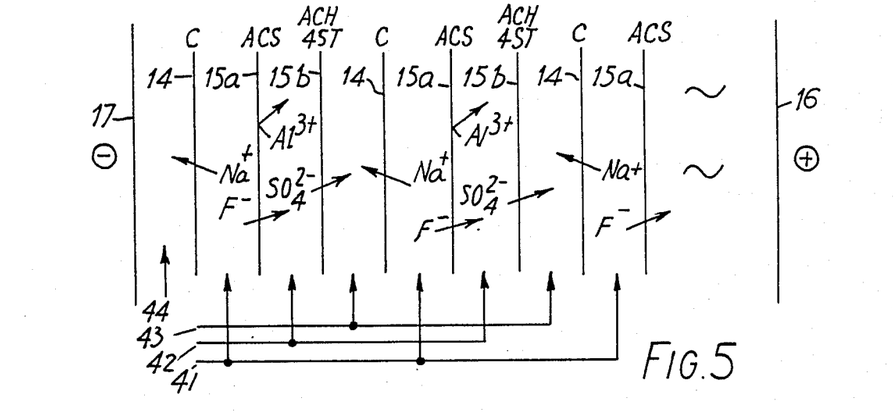
FIG. 5 is a diagram of a three-stream apparatus for converting NaF to $AlF_3$

A three stream electrodialyser using Tokuyama Soda cation-modified ACS anion- and ACH 45 T anion-transferring membranes was used to prepare an aluminium hydroxy fluoride. The modified ACS membrane is a selective membrane which is effectively impermeable to $SO_4^{--}$ ions, but accepts $F^-$ ions for transfer. The objective was to replace the $SO_4^{--}$ of $Al_2(SO_4)_3$ by $F^-$ from the NaF. FIG. 5 shows the electrodialysis stack configuration. The membranes 15a are effectively impermeable to $SO_4^{--}$ ions, whereas membranes 15b permit their transfer. The experimental conditions are recorded in TABLE 9.

TABLE 9

| | EXPERIMENTAL CONDITIONS | | |
|---|---|---|---|
| Stream No. | Volume 1 | Composition g/l | Flow ml/min |
| 41 | 2 | 10, NaF | 360 |
| 42 | 2 | 10, $Al_2(SO_4)_3$ | 360 |
| 43 | 2 | 1, $Na_2SO_4$ | 360 |
| 44 | 0.5 | 4, $Na_2SO_4$ | 150 |

Stream 44 = Electrode Rinse
Number of cell triplets 5. Voltage 18 V. Initial Current Density 15 mA/cm². Duration of run 40 minutes.

As in the previous examples the continuous recirculation technique was used. Shortly after the run had terminated, a white precipitate formed in product stream 42. This is filtered off, dried, weighed and analysed and found to be an aluminium hydroxy fluoride of the following composition: Al=24%, F=35%, $SO_4$=0.54%. The filtered solution was evaporated to dryness, weighed and analysed. The solid was found to be a mixture of $AlF_n(OH)_{3-n}$ and '$Al_2(SO_4)_3$ and had the following composition: Al=19.5%, F=46.5%, and $SO_4$=8.3%.

This solid could be converted by direct calcination to a material suitable for charging to an electrolytic reduction cell for replenishment of the $AlF_3$ content of the cell electrolyte.

EXAMPLE 19

In this example an aluminium fluoride or hydroxy fluoride was prepared by using anion-transporting membranes in a two stream configuration. In this example alternate membranes were of a modified sulphate-impermeable type developed by the Tokuyama Soda Co. for the separation of chloride from sulphate in the preparation of NaCl from seawater while the remainder of the membranes were of a sulphate-permeable type. Solutions of NaF and $Al_2(SO_4)_3$ were pumped through alternate compartments and a voltage applied. The sulphate-impermeable membranes were arranged on the anode side of the sodium fluoride streams. The objective was to replace the $SO_4^{--}$ in the $Al_2(SO_4)_3$ with $F^-$ from the NaF stream and thus form an $AlF_3$. Conditions of the experiment are shown in TABLE 10.

TABLE 10

| | EXPERIMENTAL CONDITIONS | | |
|---|---|---|---|
| Stream No. | Volume 1 | Composition g/l | Flow ml/min |
| 1 | 2 | 10, NaF | 360 |
| 2 | 2 | 13.5, $Al_2(SO_4)_3$ | 360 |

TABLE 10-continued

| | EXPERIMENTAL CONDITIONS | | |
|---|---|---|---|
| Stream No. | Volume 1 | Composition g/l | Flow ml/min |
| 3 | 0.5 | 4, $Na_2SO_4$ | 150 |

Stream 3 = Electrode Rinse
Number of cell pairs 5. Voltage 8 V. Initial Current Density 8 mA/cm². Duration of run 60 minutes.

In this arrangement the sulphate progressively transferred to the sodium fluoride stream and the fluoride progressively transferred to the aluminium sulphate stream. The continuous recirculation mode was used with samples being taken periodically from each stream for analysis. Samples of the aluminium sulphate product stream were taken at 10 minute intervals and evaporated to dryness and the solid analysed for F, Al and $SO_4$ and also by XRD. After 50–60 minutes there was about 90% transfer of fluoride and sulphate from their initial streams into the product and sodium sulphate waste streams respectively. Analysis of the solid after 60 minutes showed it to be an aluminium hydroxy fluoride of composition Al=20%, F=38%, $SO_4$=8% i.e. ~90% of the $Al_2(SO_4)_3$ had been converted to an aluminium hydroxy fluoride.

The foregoing examples show that electrodialysis may be employed in a number of ways in transforming leached-out NaF to an $AlF_3$-containing product.

In one route the $Na^+$ ion is replaced by $H^+$ to give a solution of HF. The source of the $H^+$ is a mineral acid such as $H_2SO_4$. The HF solution is then reacted with alumina to give an $AlF_n(OH)_{3-n}$, or concentrated and reacted with an alumina or alumina hydrate to give $AlF_3$. The product is calcined to give a product suitable for the Hall process. The spent solution containing residual Al salts is returned to the alumina-HF reactor.

In another scheme the electrodialyser 7 of FIG. 1 is replaced by a bipolar water splitting electrodialysis system. This can be employed to convert the NaF to HF and NaOH solution. The resultant HF solution was forwarded to reactor 9 as before, while the product NaOH solution was led from the electrodialyser to the return conduit for recycling caustic to the caustic leaching vessel 1.

In another route the anion of an aqueous solution of an aluminium salt is replaced by fluoride ion from the NaF solution by electrodialysis to give a solution of $AlF_3$ or $AlF_n(OH)_{3-n}$. Al fluoride or hydroxyfluoride is precipitated from solution by, for example, evaporation. The precipitated solid is then dried and calcined.

In these tests the continuous recirculation of the solution was employed. However in an industrial process multistage single passes of the solutions could also be employed.

EXAMPLE 20

Figure 6:
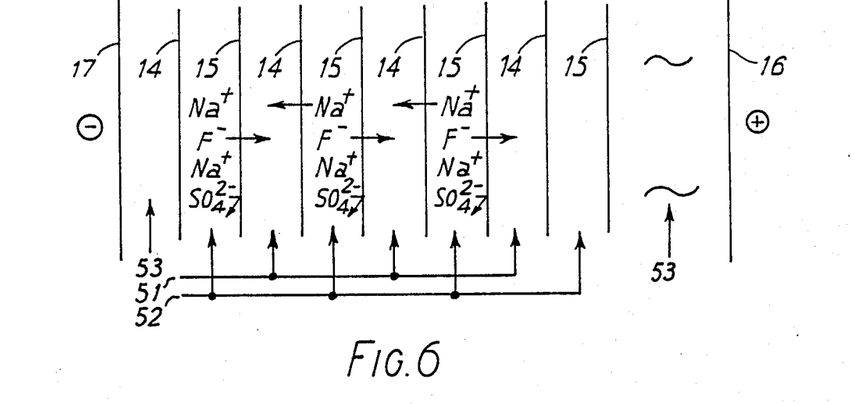
FIG. 6 is a diagram of a two-stream apparatus for separating NaF from $Na_2SO_4$.

In this example, separation of NaF from $Na_2SO_4$ in wet scrubber liquor is illustrated by FIG. 6. Streams 52 of scrubber liquor and streams 51 of dilute NaF are passed between alternating Tokuyama Soda cation-transferring membrane 14 and modified ACS anion-transferring membrane 15 pairs while D.C. is passed between anode 16 and cathode 17. Stream 53 is a dilute $Na_2SO_4$ rinse solution for anode 16 and cathode 17. $Na^+$ and $F^-$ are transferred from the scrubber stream 52 into stream 51. The result of this is a scrubber liquor depleted of NaF and a concentrated NaF stream.

EXAMPLE 21

If the NaF stream in Example 16 is replaced by wet scrubber liquor and the anion-transferring membrane in passages 22 of FIG. 3 is replaced by the anion-transferring modified ACS membrane then the separation of NaF from $Na_2SO_4$ and its conversion to HF can be carried out simultaneously.

I claim:

1. A process for the treatment of waste lining material from electrolytic reduction cells, said waste material having a substantial content of cryolite, which comprises leaching said waste material with excess aqueous caustic soda for a time sufficient to effect breakdown of contained cryolite, the aqueous caustic soda being brought to a concentration during the leaching operation such that NaF is insoluble therein and so separates as a solid therefrom, separating the solid residue from the aqueous caustic soda, washing the separated solid residue and redissolving precipitated NaF for separation from other components of the solid residue which may then be discharged as landfill material.

2. A process according to claim 1 wherein the redissolving step comprises extracting the solid residue with water, including dilute NaF solution, to separate and recover NaF therefrom in the form of an aqueous solution.

3. A process according to claim 2 in which the aqueous caustic soda solution contains 200–400 g/l caustic (calculated as $Na_2CO_3$).

4. A process according to claim 2 wherein washing step includes washing the solid residue with small quantities of relatively dilute caustic soda solution before the redissolving step.

5. A process according to claim 2 in which said solution of NaF is subjected to electrodialysis for obtaining a solution of HF.

6. A method of treating fluoride-containing wastes which comprises
    (a) digesting the waste with aqueous caustic soda containing 200–400 g/l caustic (calculated as $Na_2CO_3$)
    (b) separating solid residues from the digest liquor
    (c) extracting NaF from the solid residues by contact with aqueous liquor
    (d) separating the resulting solution of NaF from the washed solid residue
    (e) forwarding a stream of NaF solution to an electrodialysis cell
    (f) dialysing said NaF solution in said cell to produce an HF-containing liquid stream and an Na ion-containing liquid stream in said cell.

7. A method according to claim 6 in which said NaF solution is passed through said electrodialysis cell in a plurality of streams, each bounded by a first face of a cation-transporting membrane and a first face of an anion-transporting membrane, each of said membranes also having a reverse face, a dilute HF solution being passed along the reverse face of the anion-transporting membrane and a dilute NaOH solution being passed along the reverse face of the cation-permeable membrane, said dilute HF solution and said dilute NaOH solution being separated by a bipolar membrane, said NaF solution, after depletion of its NaF content, being returned as aqueous liquor to the NaF extraction stage.

8. A method according to claim 6 in which the temperature of the caustic liquor in the digestion stage is 70°–95° C.

9. A method according to claim 6 in which waste in the form of ground spent potlining from electrolytic reduction cells for the production of aluminium is charged to the caustic liquor in an amount of 250–1250 grams of said waste per liter of said liquor.

* * * * *